June 1, 1926.

H. M. DENYES 1,587,219

STEERING GEAR ASSEMBLY

Filed Nov. 6, 1925

Inventor

HARRY M. DENYES

By Blackmore, Spencer & Flint

Attorneys

Patented June 1, 1926.

1,587,219

UNITED STATES PATENT OFFICE.

HARRY M. DENYES, OF SAGINAW, MICHIGAN, ASSIGNOR TO GENERAL MOTORS CORPORATION, OF DETROIT, MICHIGAN, A CORPORATION OF DELAWARE.

STEERING-GEAR ASSEMBLY.

Application filed November 6, 1925. Serial No. 67,370.

This is an improvement on the steering gear assembly described and claimed in Patent No. 1,516,346, granted November 18, 1924, to Benjamin L. Lemmer.

It is the object of this invention to provide a control assembly in which the majority of parts requiring manual operation in the ordinary running of the machine are disposed in a compact manner within the steering shaft. In the Lemmer construction two operating shafts were nested within the steering shaft and at the uppermost part of the column a push button member was provided for operating the usual horn. To this assembly I have added a third operating shaft and have preferred to mount the push button control member above the operating member for the third shaft.

My invention may also be regarded as embodying a construction in which a stationary member is mounted in a concentric position with respect to a steering shaft containing a plurality of nested control shafts, the operating means for one of said control shafts extending below the stationary member and the operating means for another control shaft extending above the stationary member and having an operating device mounted upon it.

My invention also comprises an improvement in assembly of the type described wherein a stationary supporting tube is arranged within the hollow steering shaft to the upper end of which a steering wheel is secured, in that the hub of the steering wheel is made of hollow formation and the stationary tube is provided with means housed in said hollow hub which serves to center it and at the same time produce a more sightly appearance.

Referring to the drawings:—

Figure 2:
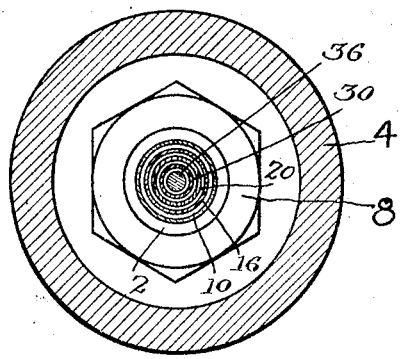
Figure 2 is a section on line 2—2 of Figure 1.
Figure 1:
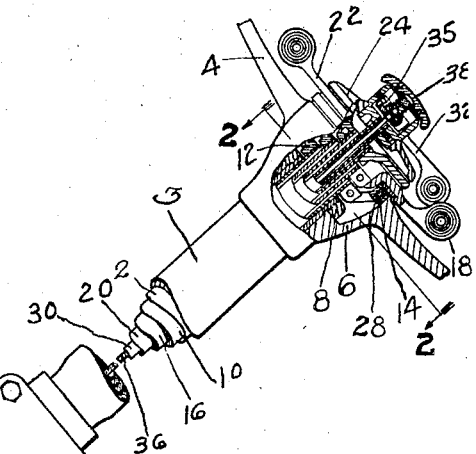
Figure 1 is a side elevation of my improved steering assembly, with parts broken away and sectioned to better show the construction.
Figure 4:
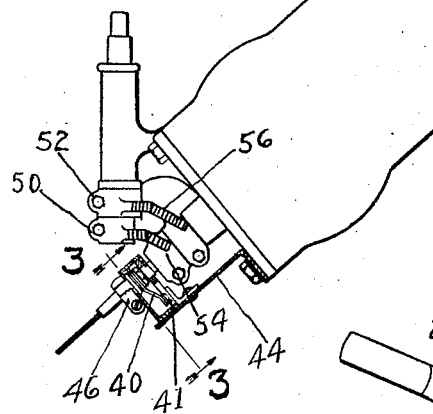
Figure 4 is a top plan view of the controls.
Figure 4:
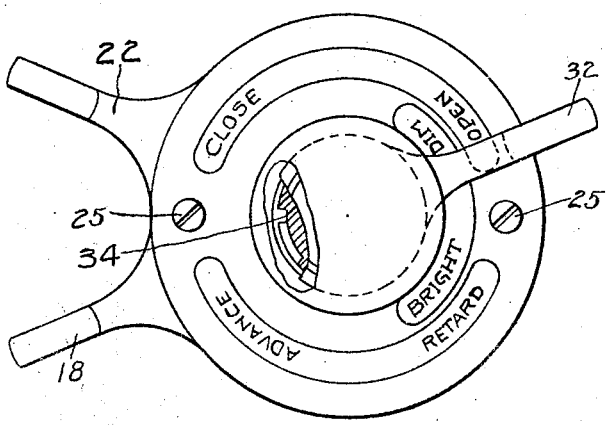
Figure 3:
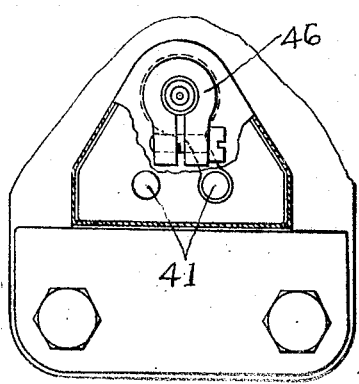
Figure 3 is a view taken on line 3—3 of Figure 1, with parts broken away.

To the upper end of the hollow steering shaft 2 enclosed within the usual housing 3 is secured the steering wheel 4 having a hollow hub 6. The nut 8 serves to hold the steering wheel upon the steering tube. Within the steering tube 2 is located the stationary tube 10 to the upper end of which is clamped a member 12 provided with an annular portion 14 which engages the interior of the hollow hub and centers the stationary tube 10.

Within the stationary tube 10 is nested shaft 16 to the upper end of which is secured an operating member in the form of a disk 18 provided with a suitable handle, and within the shaft 16 is located a shaft 29, also provided at its upper end with a disk 22 having a suitable handle for manipulation. A member 24, preferably annular in form, is secured to the member 14 by means of screw bolts 25, said members 14 and 26 being spaced throughout the greater portions of their periphery to provide slots through which the operating members secured to disks 18 and 22 may project. Springs 28 are provided upon the member 14, these springs serving to exert an axial pressure upon the operating disks and their corresponding shafts so as to frictionally hold the disks in adjusted position. The disks, as well as the stationary members, may be provided with faces of friction material to increase the gripping action. Within the shaft 20 is nested a hollow shaft 30 to the upper end of which is secured an operating member 32 having a hub which is journaled within the opening in the annular member 24, the said hub and the member 24 being provided with suitable means such as a pin-and-slot, as shown at 34, to limit the extent of movement of the member 32. The hub of the member 32 is of hollow formation to house the contact 35 to which leads a wire 36 passing through the shaft 30 and suitably connected in one of the control circuits such as that leading to the customary horn. A push button member 38 is mounted above the hollow hub and upon depression establishes connection between the contact and ground, in this case the metallic parts of the steering gear assembly, thus completing the circuit which produces energization of the horn. The details of construction of this switch are more clearly disclosed in the Lemmer patent previously referred to.

To the lower end of the tubular shaft 30 is secured a movable contact member 40 which cooperates with contacts 41 to effect control of a suitable circuit, such as the usual lighting circuit to effect either a dimming of the lights or other change in illumination. If desired, a dimmer resistance may be incorporated in the switch. As shown, the switch is housed in a casing 42 supported by a bracket 44 from the lower end of the steering gear housing. To the lower end of the shaft 30 is secured a clamping collar 46 which holds the shaft against upward movement.

The shafts 16 and 20 operate stub shafts 50 and 52 by means of gearing shown at 54 and 56, respectively, in a convenient manner, these connections customarily to control the adjustments of spark and throttle.

I claim:—

1. The combination of a hollow steering shaft, a steering wheel secured to said shaft and having a hollow hub, a stationary support nested within said shaft and a means extending outwardly from said support and engaging the interior of said hub for centering the member therein.

2. The combination of a hollow steering shaft, a steering wheel secured to said shaft and having a hollow hub, a stationary cylindrical support nested within said shaft, means secured to said support and engaging the interior of said hub for centering the support in the hub, a member superposed upon said means and secured thereto to provide a slot between said member and means, an operating shaft nested in said cylindrical support, and an operating member secured to said shaft and extending through said slot.

3. In the combination as defined by claim 2, a shaft nested within said operating shaft and passing through said member, and an operating member secured to the upper end of said last named shaft.

4. In the combination as defined by claim 2, a shaft nested within said operating shaft and passing through said member, an operating member secured to said last named shaft, and cooperating means on said innermost shaft and said member for limiting the amount of movement of said shaft.

5. The combination of a hollow steering shaft, a steering wheel secured to said shaft and having a hollow hub, a stationary cylindrical support nested within said shaft, means secured to said support and engaging the interior of said hub for centering the support in the hub, a member superposed upon said means and secured thereto to provide a slot between said member and means, an operating shaft nested in said cylindrical support, an operating member secured to said shaft and extending through said slot, and a hollow shaft nested within said operating shaft and passing through said member, an operating member secured to said last named shaft, and a push button switch mounted in the hub of said last named operating member.

6. A steering gear comprising, in combination, a manually rotatable steering tube, a rotatable tube nested within the steering tube, an operating device secured to the top of the said rotatable tube, stationary supports on opposite sides of said operating device, said operating device being frictionally gripped between said supports, a tubular shaft nested within the said rotatable tube and projecting through said stationary supports, operating means secured to the upper end of said shaft, and a push button member mounted in the said operating means and having coacting parts passing downwardly through said tubular shaft.

7. In the combination as defined by claim 6, means secured to the bottom of said tubular shaft for limiting its upward movement.

8. In the combination as defined by claim 6, a dimmer switch secured to the bottom of the said steering gear and actuated by said tubular shaft.

9. A steering gear comprising, in combination, a manually rotatable steering tube, a rotatable tube nested within the steering tube, an operating device secured to the top of the said rotatable tube, a second rotatable tube nested within the first named rotatable tube, an operating device secured to the top of the second named rotatable tube and overlying the first named operating device, stationary supports on opposite sides of said operating devices, said operating devices being frictionally gripped between said supports, a tubular shaft nested within said second named rotatable tube and projecting through said stationary supports, and an operating device secured to the upper end of said shaft.

10. In the combination as defined by claim 9, a depressible operating member superposed upon said last named operating device.

11. In a steering gear assembly, the combination of a rotatable steering tube, a steering wheel secured to the upper end of said steering tube, a stationary tube nested within said steering tube, a member supported on the upper end of said stationary tube, an operating shaft nested within said stationary tube and journaled within said stationary member, and a manipulative device secured to the upper end of said last named operating shaft and provided with a hollow hub, and a depressible operating device arranged within said hollow hub.

In testimony whereof I affix my signature.

HARRY M. DENYES.